Figure 1:
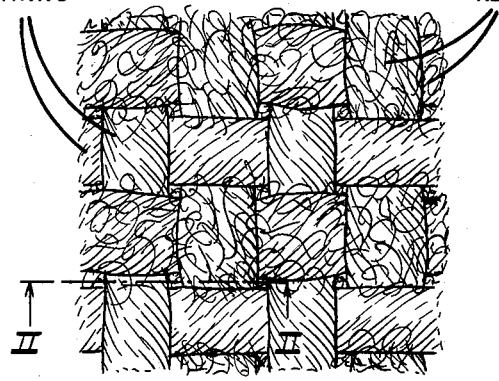

Oct. 28, 1952   W. P. CRAWLEY   2,615,477
FILTER MEDIA
Filed March 18, 1948

INVENTOR.
WILLIAM P. CRAWLEY
BY
ATTORNEY.

Patented Oct. 28, 1952

2,615,477

UNITED STATES PATENT OFFICE 2,615,477

FILTER MEDIA

William P. Crawley, Media, Pa., assignor to American Viscose Corporation, Wilmington, Del., a corporation of Delaware Application March 18, 1948, Serial No. 15,730

3 Claims. (Cl. 139—426)

This invention relates to filter media comprising woven fabrics formed entirely of yarns of a vinyl resin, at least one of the yarn systems of the fabric comprising spun yarns, that is, yarns formed from discontinuous fibers of the resin.

It has been proposed previously to replace the conventional cotton or wool filter media with fabrics made from continuous filaments of vinyl resins resulting from the copolymerization of a vinyl halide and an aliphatic acid ester. Filter media comprising masses of matted discontinuous fibers of those resins adhesively bound to a fabric backing have also been proposed as substitutes for the wool or cotton filters. The mentioned vinyl resins are particularly well suited to use in filter media because of their notable resistance to both acid and alkaline solution and hydrocarbons, as well as immunity to bacteria or fungal attack. However, both types of filter media comprising the resins which have been proposed heretofore have certain inherent disadvantages and are not adapted for use in all filtration processes. Those filter media have only a limited field of usefulness.

Fabrics consisting entirely of the extremely smooth, continuous vinyl resin filaments are only useful when the particles to be filtered out are comparatively large or coarse. It is not possible to weave a fabric of such tight construction that the interstices between the yarns will be as small as is required in filtering some types of materials, for example, in filtering biological products or the like. Smaller particles slip very easily over and between the smooth, slick surfaces of the continuous vinyl resin filament yarns and through the comparatively large and well defined interstices which exist between the smooth-surfaced continuous filament yarns even in the most closely woven fabric. It is only in the case of liquids containing particles all of which are relatively large that it is possible to obtain a clear filtrate, using a filter constructed entirely of continuous filament yarns of the vinyl resins.

The copolymeric resin filaments tend to shrink on heating, particularly if they have been subjected to after-stretching either during or subsequent to their production. It has been suggested to take advantage of this property of the filaments, and to effect heat-shrinkage of the after-stretched filaments in the filter fabric, thereby shrinking the fabric as a whole, and thus reducing the size of the interstices between the yarns. However, even after such shrinkage, unless the filaments are caused to flow and form a film which renders the fabric useless as a filter for any material, the interstices between the yarns are still much larger than is permissible in filtering many materials. The holes are all round, defined by smooth, slick surfaces, of uniform size, and lie in a single plane. The holes extend directly clear through the fabric from one surface to the other. Smaller particles present in the liquid being filtered can slip directly through the holes, sliding over the smooth surfaces of the continuous filament yarns.

Filter media comprising a mass of the discontinuous copolymeric resin fibers adhesively secured to a fabric backing become clogged very readily, and cannot be washed entirely clean, even by back-washing. This makes it necessary to discard filter media comprising the mass of discontinuous fibers after very brief periods of use. It is practically imposible to utilize such discontinuous fiber masses for filtering purposes on any extensive scale, because of the time and expense involved.

The present invention provides a vinyl resin filter fabric which has all of the advantages of immunity to chemical and fungal attack which is characteristic of the resins, and at the same time is useful in filtering liquids containing particles of any size, including particles which are extremely small, and even microscopic.

The filter medium of the invention comprises a woven fabric consisting entirely of yarns of a vinyl resin, specifically, yarns comprising a copolymer of vinyl chloride with vinyl acetate or with vinyl cyanide, at least one of the yarn systems of the fabric comprising spun yarns formed from discontinuous fibers of the vinyl resins.

Spun yarns of the synthetic thermoplastic vinyl resins have never been available heretofore.

I find that if extreme care is taken, discontinuous fibers of the vinyl resins, and particularly those resins comprising a copolymer of vinyl chloride and vinyl acetate, or a copolymer of vinyl chloride and vinyl cyanide, can be spun into a yarn on conventional spinning machines. Such spun yarns have particular advantages in fabrics to be used as filter media, and vastly broaden the field of application of the vinyl resin filter media. The new filter media comprising the spun yarns of the discontinuous vinyl resins are adapted for use in fine filtration processes, as well as when the particles to be filtered are comparatively large.

The presence of the spun yarns comprising discontinuous fibers of the vinyl resins completely alters the appearance and filtering properties of the woven fabric as compared to the appearance and filtering properties of a fabric woven entirely of yarns formed from continuous filaments of the resins. The spun yarns are characterized by a rough or hairy-like surface, which results from the fact that the short fibers are only loosely interlocked together and the ends of the short fibers protrude from the body of the yarn to an extent which is greater than is generally the case for abraded yarns formed from continuous filaments. The protruding fiber ends serve an important function in the filter fabrics of this invention. When the yarns are woven into a fabric, the fiber ends protruding from one spun yarn become entangled or meshed with the fiber ends protruding from an adjacent spun yarn in the fabric, to form a network which bridges over at least a portion of each of the interstices in the fabric, thereby effectively partially closing or reducing the size of the interstices between the yarns. In the final fabrics, the interstices, which are defined by the rough surfaces of the spun yarns, are all partially closed by the intermeshing protruding fiber ends. Also, the holes are of different shape and lie in two planes, following an irregular course through the fabric, from one surface to the other, to form channels which bend through the fabric, as is evident when the fabric is held to the light and examined microscopically. A hole appearing at any given point in the face of the fabric, bends or meanders through the fabric, and appears at a point in the back of the fabric which is spaced away from the point at which the hole appears on the fabric face. The holes are of different shapes. Some of the holes are triangular, while others appear as elongated slits, still others being more or less oval or egg-shaped. When liquids containing very small, even microscopic, particles are filtered, using, as filter medium, a fabric comprising the spun yarns formed from discontinuous fibers of the copolymeric vinyl resins, the channels formed in the fabric serve to trap the fine, small particles and prevent passage thereof through the fabric. Filtrates of excellent clarity are usually obtained after only one passage of the liquid containing undesired particulate material through a woven filter fabric comprising the spun vinyl resin yarns, in accordance with this invention.

The woven fabric of the invention may consist entirely of the spun yarns. However, a fabric consisting entirely of the spun yarns does not possess sufficient mechanical strength for some filtering purposes. In the preferred embodiment of the invention, therefore, the spun yarns formed from the discontinuous resin fibers are used in combination with yarns formed from continuous filaments of the resins. Preferably, at least 50% of the yarns of the woven fabric are yarns spun from the discontinuous fibers of the resins, and in the case of any two adjacent yarns in each system comprising such spun yarns, at least one of the yarns is a yarn comprising a spun component. For example, one yarn system of the fabric, either the warp or weft, may consist wholly of the spun yarns, while the other yarn system consists entirely of the continuous filament yarns. Or the continuous filament yarns and spun yarns may alternate in both warp and weft, if the alternation is 1:1 in both yarn systems. Also, plied yarns obtained by plying at least one continuous filament yarn with at least one spun yarn may be used in constructing the filter fabric. For example, the plied yarns may be obtained by twisting or doubling three singles yarns spun from discontinuous fibers of the vinyl copolymers with three singles yarns formed from continuous filaments of the copolymers. Such plied yarns may be used exclusively in the weft, or exclusively in the warp of the fabric, or they may alternate with either spun yarns or continuous filament yarns in both the warp and weft provided that the alternation is 1:1 in both yarn systems.

Most desirably, spun yarns of from 1 to 5 denier per filament are used in constructing the filter media. For some purposes, the filter fabric may be subjected to heat to effect heat-shrinkage of the continuous filament yarns in situ in the fabric. However, such shrinkage is not required for most purposes, and the continuous filament yarns may be formed from filaments or threads of the resin which have not been subjected to strong after-stretching. Whether the continuous filament yarns are heat-shrunk in situ in the fabric or not, the interstices in the fabric are extremely small and irregular in size, being, in all cases, reduced in size and of varying shape by reason of the haphazard intermeshing of the fiber ends protruding from each of the spun yarns, with fiber ends protruding from adjacent spun yarns.

Figure 2:
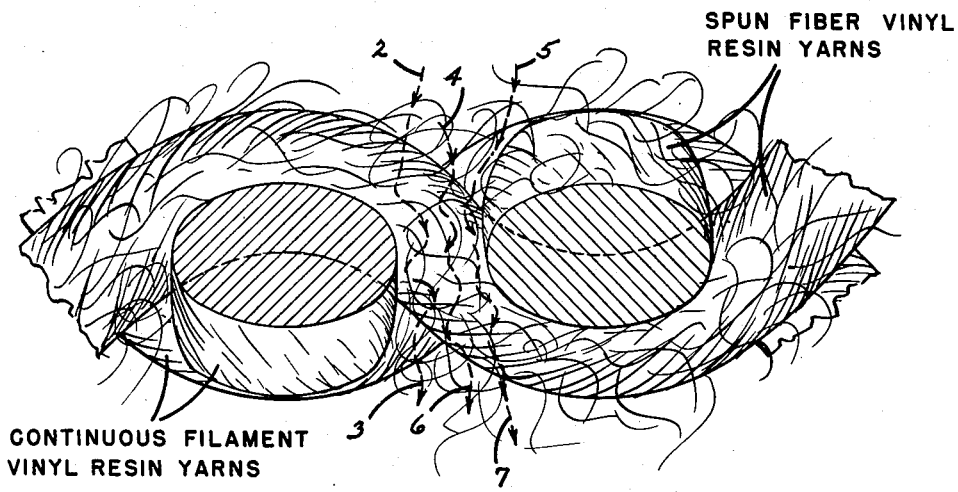

The invention will be better understood by reference to the accompanying drawing in which:

Figure 1 is an enlarged view of a piece of filter fabric woven from continuous filament resin yarns and spun fiber vinyl resin yarns in which the yarns occur in a regularly alternating 1:1 pattern, in both yarn systems as indicated by the legends, and Figure 2 is a section taken on line II—II of Figure 1.

Referring to Figure 2, the arrows shown follow the irregular, meandering course of the channels through the fabric defined by the intermeshing fibers projecting from the spun yarns of the warp with fibers projecting from adjacent spun yarns in the filling. As shown, a channel appearing at a point 2 on the upper surface of the fabric bends through the fabric to appear at point 3 on the opposite surface thereof. Similarly, channels which appear at 4 and 5 on the upper surface appear at 6 and 7, respectively, on the opposite surface.

Filter fabrics comprising the yarns spun from discontinuous fibers of the vinyl copolymers and continuous filament yarns of the copolymers, as described herein, are characterized by resistance to chemical and fungal attack to the same extent as are fabrics formed entirely from continuous filament yarns of the resins and have a mechanical strength comparing favorably to that of fabrics formed entirely of the continuous filament yarns. The new fabrics differ from the continuous filament fabrics in that the interstices are not round and smooth, and by virtue of the fact that they can be used in filtering liquids containing exceedingly fine particles or minute bodies. The new filter fabrics comprising spun yarns of a copolymer of vinyl chloride and vinyl acetate, or of vinyl chloride and vinyl cyanide, have a wider field of general usefulness than do fabrics consisting entirely of continuous filament yarns of those resins and are useful for purposes and under conditions for which the fabrics formed entirely of the continuous filament yarns are wholly unfitted. For example, a fabric having a weft consisting entirely of yarns spun from discontinuous fibers of a copolymer of vinyl chloride and vinyl acetate containing about 90% of vinyl chloride in the molecule, and a warp consisting entirely of yarns formed from continuous filaments of the copolymer, was found, in actual large scale comparison tests, to have a filtering efficiency 40 times as great as that of a fabric formed entirely from the continuous filament yarns. Comparable results were obtained, using a fabric of the same construction but having a weft formed of yarns spun from discontinuous fibers of a copolymer of vinyl chloride and vinyl cyanide containing about 55% vinyl chloride in the molecule, and a warp formed of continuous filament yarns of the copolymer.

The new filter media comprising yarns spun from discontinuous fibers of the vinyl copolymers, whether formed entirely of such spun yarns or from the spun yarns and some continuous filament yarns as described herein, have very important advantages over other types of prior art filter fabrics, such as fabrics formed from, say, cotton yarns.

Filter fabrics comprising the yarns spun from discontinuous fibers of the vinyl copolymers have been found, in practice, to have a useful filtering life which is from six to ten times longer than the filtering life of cotton filter fabrics.

The fabrics of the invention may be used as such or they may be used as filtering bodies made up of a wound fibrous material, a wound gimp material, or any porous body such as chamois, stone, or ceramic ware.

Variations and modifications may be made in the practice of the invention without departing from the spirit and scope thereof, as defined in the appended claims.

I claim:
1. An all-vinyl resin filter medium comprising a fabric woven from yarns formed from continuous filaments of a vinyl resin and yarns formed from discontinuous fibers of a vinyl resin, the continuous filament yarns and the discontinuous fiber yarns alternating regularly in a 1:1 pattern in both yarn systems of the fabric, the ends of the discontinuous fibers protruding from each yarn comprising such fibers being meshed with the ends of fibers protruding from an adjacent yarn comprising discontinuous fibers to form a network which bridges each of the interstices of the fabric, thereby partially closing interstices between the yarns, said fabric being characterized by channels which lie in two planes in the fabric and bend through the fabric from one face thereof to the other.

2. A filter medium as in claim 1, wherein the fabric is woven from yarns of a copolymer of vinyl chloride and vinyl acetate.

3. A filter medium as in claim 1, wherein the fabric is woven from yarns of a copolymer of vinyl chloride and vinyl cyanide.

WILLIAM P. CRAWLEY.

REFERENCES CITED

The following references are of record in the file of this patent:

UNITED STATES PATENTS

| Number | Name | Date |
|---|---|---|
| 2,132,524 | Booth | Oct. 11, 1938 |
| 2,161,766 | Rugely et al. | June 6, 1939 |
| 2,262,872 | Whitehead | Nov. 18, 1941 |
| 2,313,058 | Francis | Mar. 9, 1943 |
| 2,338,610 | Wiley | Jan. 4, 1944 |
| 2,433,722 | Weiss | Dec. 30, 1947 |
| 2,468,304 | Musselman | Apr. 26, 1949 |
| 2,504,523 | Harris et al. | Apr. 18, 1950 |